United States Patent
Loken et al.

(10) Patent No.: US 6,651,789 B1
(45) Date of Patent: Nov. 25, 2003

(54) LIMITER MEANS FOR A RELEASE SPRING OF A BRAKE CABLE

(75) Inventors: Phillip Ingmar Loken, Edwardsburg, MI (US); Robert Lee Wagner, Plymouth, IN (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 10/171,142

(22) Filed: Jun. 13, 2002

(51) Int. Cl.$^7$ ............................................... F16D 51/00
(52) U.S. Cl. ..................... 188/328; 188/325; 188/79.51
(58) Field of Search ........................... 188/74, 78, 325, 188/327, 328, 329, 330, 331, 332, 79.54, 79.51, 79.55, 79.56, 79.57, 79.58

(56) References Cited

U.S. PATENT DOCUMENTS 5,105,682 A * 4/1992 Jung ......................... 74/502.4
5,720,367 A * 2/1998 Evans ......................... 188/325

* cited by examiner

*Primary Examiner*—Jack Lavinder
*Assistant Examiner*—Thomas J. Williams
(74) *Attorney, Agent, or Firm*—Leo H McCormick, Jr; Warren Comstock

(57) ABSTRACT

A drum-in-hat park brake assembly for a vehicle wherein first and second brake shoes are retained and aligned on a backing plate by first and second pins. The first and second shoes are moved into engagement with a drum by a force applied to an actuator by a cable assembly. The backing plate is characterized by a flange having a slot therein and the cable assembly is characterized by a cable with a fitting on a first end that has a stem with an annular rib thereon. The stem passes is passed through the slot while the annular rib engages the flange to limit the movement of the first end of the cable toward the actuator and to limit the movement of the first end toward the actuator mechanism to prevent the lever from being axially moved past a position of rest and change the radial alignment between the first and second brake shoes and the backing plate by the action of a release spring.

6 Claims, 5 Drawing Sheets

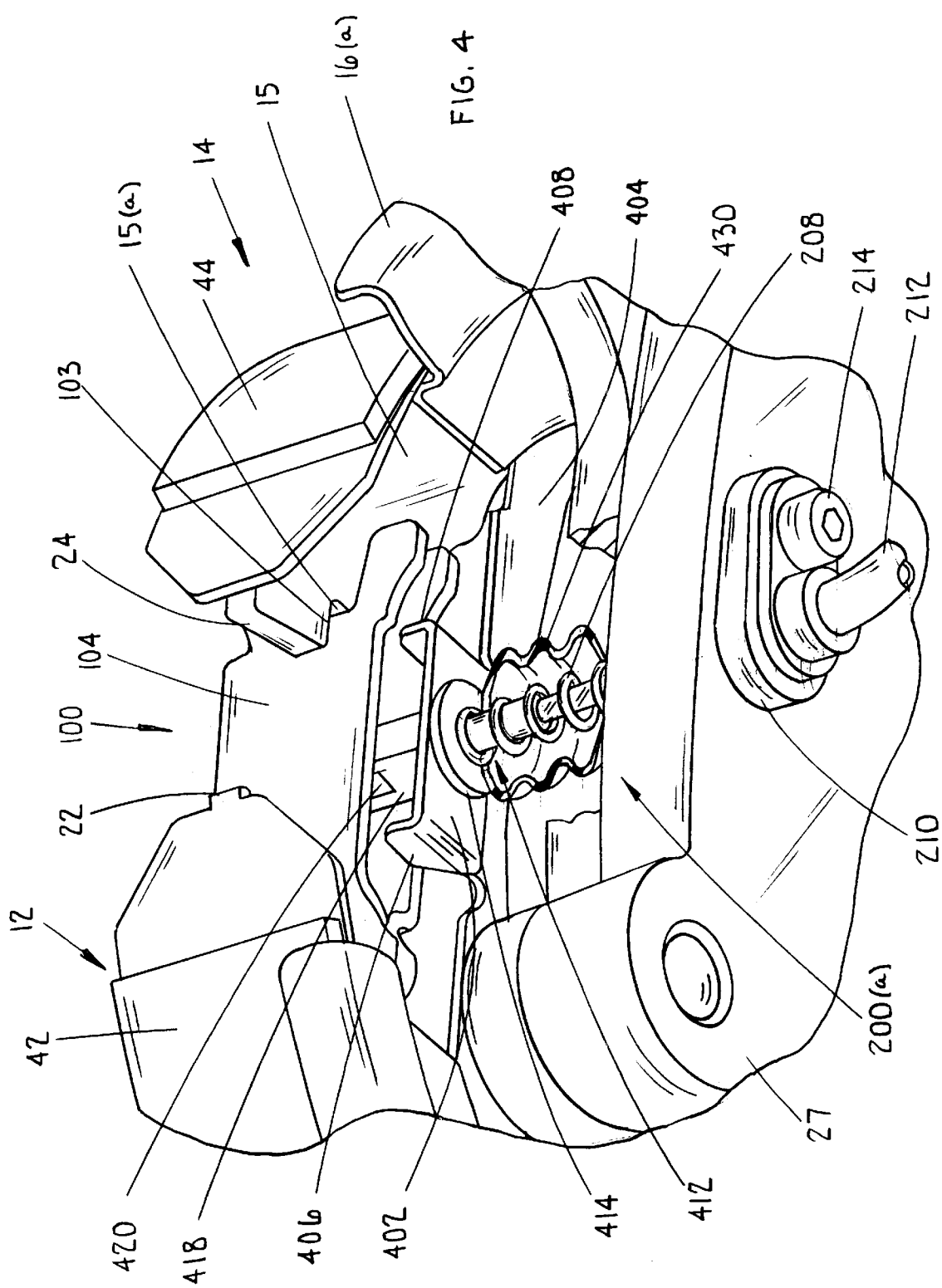

LIMITER MEANS FOR A RELEASE SPRING OF A BRAKE CABLE

This invention relates to a cable assembly for actuating and releasing a parking brake and means whereby a release spring that acts on an end of a cable engages a flange on a backing plate of to limit the force of the release spring and prevent the release spring from moving the first and second brake shoes out of radial alignment with a backing plate and into axial engagement with a drum.

BACKGROUND OF THE INVENTION

A parking brake is often associated with a drum brake and activated by a cable moving a lever to mechanically move first and second brake shoes into engagement with a drum to effect a parking brake application. Numerous mechanisms have been devised for attaching the cable to the end of the lever such as the ball retention structure as disclosed in U.S. Pat. No. 5,142,935 and the resiliently positioned bushings as disclosed in U.S. Pat. Nos. 5,105,682 and 5,174,170. These type connections function in an adequate manner with respect to a drum brake but with the introduction of drum-in-hat structure associated with four wheel disc brakes, the space available for the inclusion of parking brake components was limited and as a result new actuation devices were developed such the lever disclosed in U.S. Pat. No. 5,180,037 and the cross pull structure disclosed in U.S. Pat. No. 6,234,281. In a cross pull actuation device, a release spring is fixed to the knuckle of a suspension system. On termination of an input force applied through a cable to effect a parking brake application, the release spring moves the cable and allows the actuator mechanism to be moved to a position of rest by springs associated with the first and second brake shoes that also move the brake shoes out of engagement with an engagement surface on the drum. Unfortunately, the force on the release spring may at times also act on the actuator mechanism and move the first and second brake shoes out of radial alignment with the backing plate and into axial engagement with the drum such that noise is produced and damage may occur to the first and second brake shoes.

SUMMARY OF THE INVENTION

A primary object of the present invention is to provide a drum-in-hat brake with structure with means such that on the termination of an input force applied to a cable for effecting a parking brake application, the release force of a release spring is limited and as a result a radial alignment between first and second brake shoes and a backing plate is not changed by the release spring acting on and moving an actuator mechanism and first and second brake shoes with respect to a backing plate for the parking brake.

In more particular detail, the drum-in-hat park brake for a vehicle according to the present invention has first and second brake shoes that are positioned on and radially aligned on a backing plate by first and second pins secured to a backing plate that is fixed to a knuckle of a suspension system in a vehicle. Each of the first and second brake shoes has a first end that is aligned with respect to an anchor post extending from the knuckle and selectively spaced apart from each other by an actuator mechanism while a second end for the first and second brake shoes are linked to each other by an adjuster mechanism. A resilient arrangement including at least first and second return springs is attached to the first and second brake shoes for urging the first ends toward the anchor and the second ends toward the adjuster mechanism to define a rest position for the first and second brake shoes. In the rest position, a running clearance is established between the first and second brake shoes and an engagement surface on the drum. A cable assembly that is fixed to the knuckle has a first end that is connected to a lever of the actuator mechanism and a second end that receives an input force from an operator. The cable assembly responds to an input force applied to the second end by pulling on the lever to expand the actuator assembly and move the first and second brake shoes from the position of rest into engagement with a drum to effect a parking brake application. On termination of the input force on the second end, a release spring in the cable assembly urges the first end toward the actuator mechanism to allow the resilient arrangement to move the first and second brake shoes to the position of rest. The backing plate is characterized by a flange with a horizontal slot therein that is aligned with the lever of the actuator mechanism while the cable assembly is characterized in that the first end includes a stem with an annular rib thereon. The stem passes through the horizontal slot and is connected with the lever while the annular rib engages the flange to limit the movement of the first end toward the actuator mechanism by the release force applied by the release spring on the cable. Thus, the stem does not move the lever in the actuator mechanism past a position of rest nor push on the lever to change the radial alignment between the first and second brake shoes with respect to the backing plate on termination of the input force.

An advantage of the cable assembly and backing plate connection provided by the present invention resides in the limiting action of the release spring in moving the actuator mechanism to a position of rest without effecting a radial alignment between the brake shoes and backing plate.

An object of this invention is to provide structure whereby a release spring of a cable assembly is caged between a backing plate and a knuckle to prevent the force of the release spring from effecting the radial alignment between brake shoes and a backing plate in a drum-in-hat brake.

BRIEF DESCRIPTION OF THE DRAWINGS

FIG. 3 is a schematic illustration of a drum-in-hat parking brake having a cable assembly connected to an actuator mechanism according to the principals of the present invention;

FIG. 4 is an enlarged view of the cable assembly and actuator mechanism of FIG. 3;

DETAILED DESCRIPTION

Figure 1:
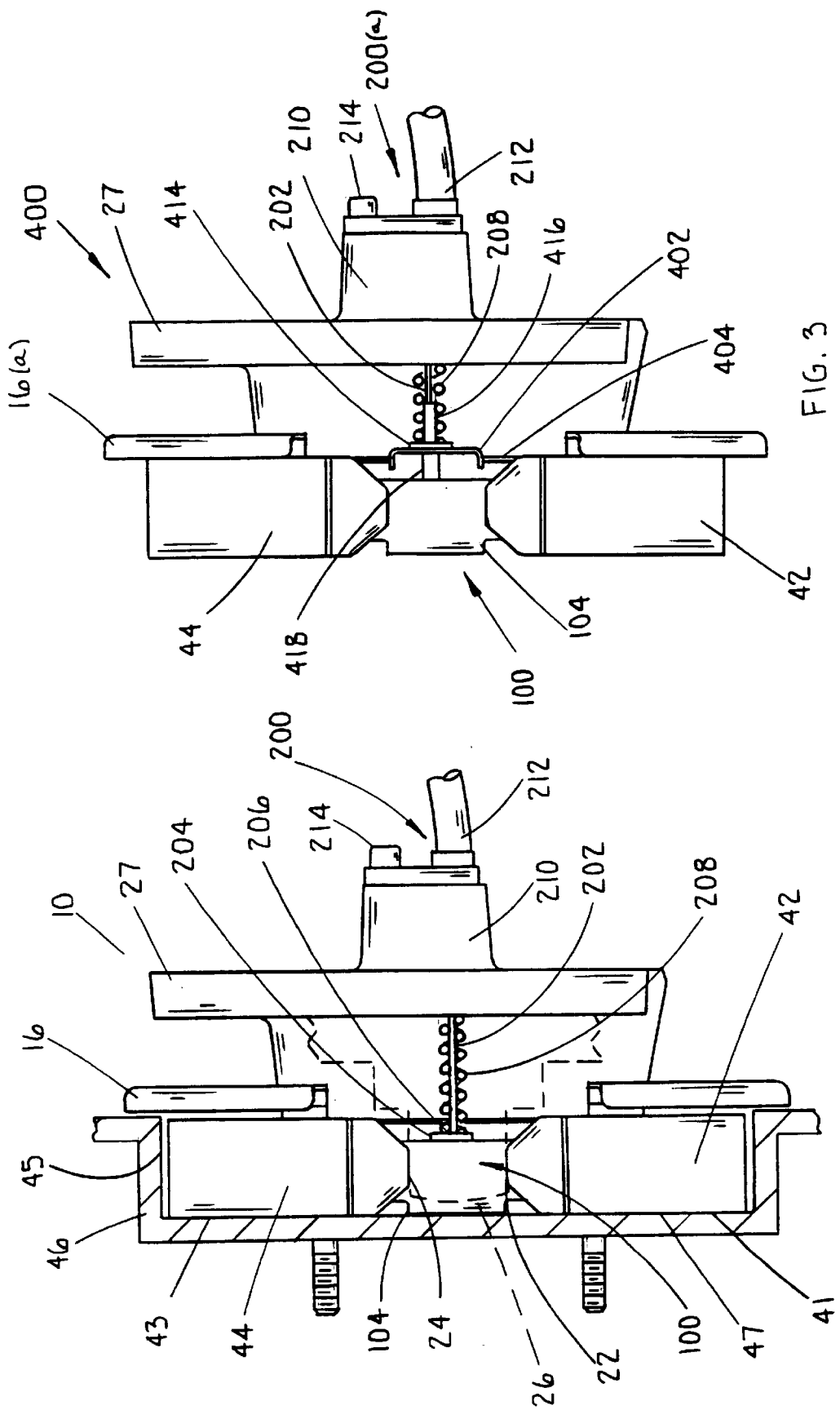
FIG. 1 is a schematic illustration of a portion of a prior art drum-in-hat parking brake for use in a vehicle.
Figure 2:
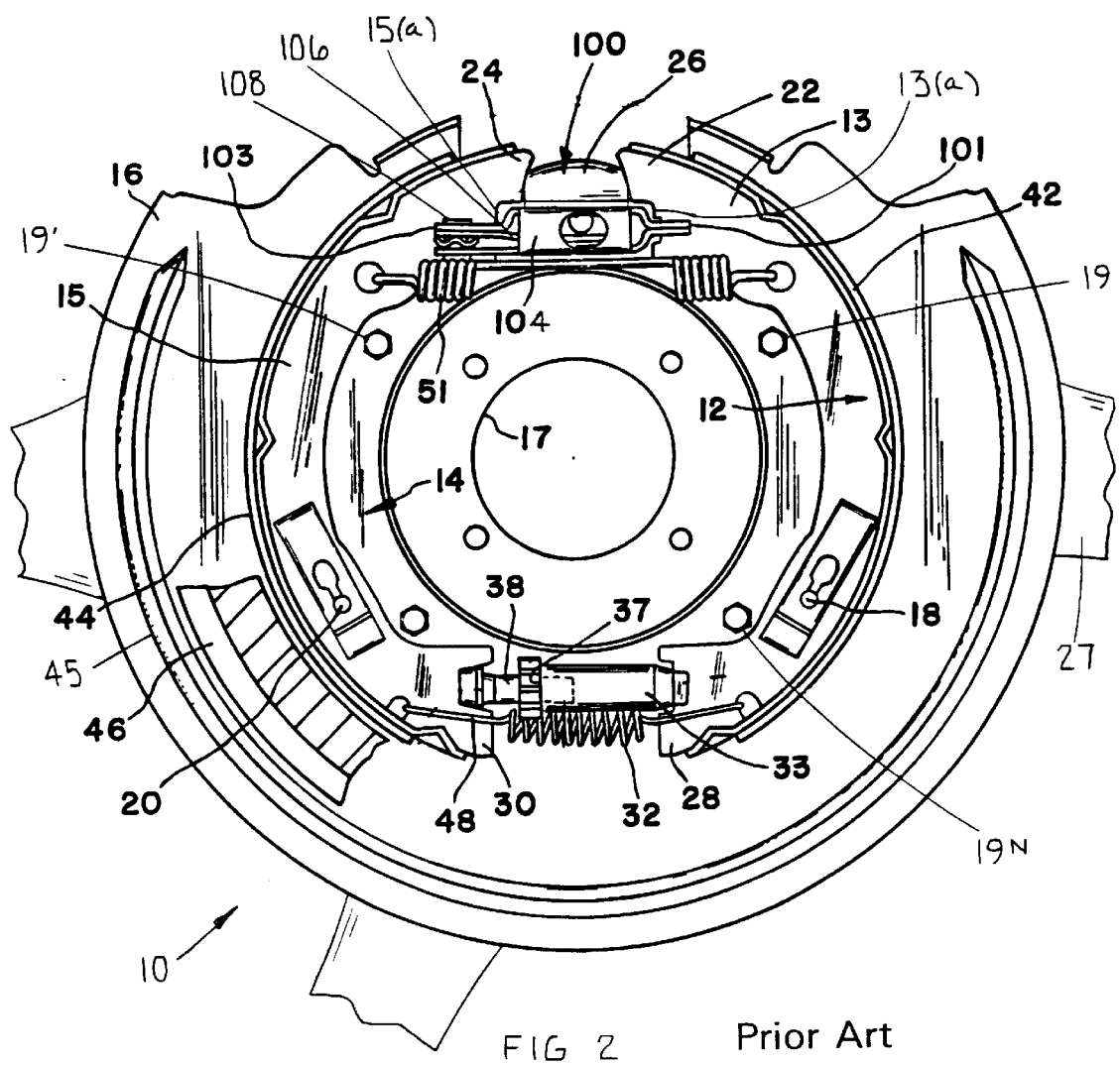
FIG. 2 is a front view of the drum-in-hat parking brake of FIG. 1.

The drum-in-hat brake 10 shown in FIGS. 1 and 2 for use in a vehicle is known in the prior art for effecting a parking brake application. The drum-in-hat brake 10 includes a backing plate 16 that is fixed by bolts 19,19' . . . 19" to a knuckle 27 associated with a corner assembly for a vehicle. The backing plate 16 has an opening 17 therein through which axle shaft of the vehicle passes. First 12 and second 14 brake shoes are retained in radial alignment on a backing plate 16 by first 18 and second 20 pins secured to the backing plate 16. Brake shoe 12 has a first end 22 and brake shoe 14 has a first end 24 that, respectively, contact an anchor block 26, shown in phantom in FIG. 1, that extends from knuckle 27. Further, brake shoe 12 has a second end 28 and brake shoe 14 has a second end 30, that respectively contact an adjuster strut mechanism 32, the strut mechanism 32 being of a type as illustrated in U.S. Pat. Nos. 4,502,574 and 5,480,010. The adjuster strut mechanism 32 links web 13 on brake shoe 12 with web 15 on brake shoe 14 such that a force experienced by engagement of each brake shoe 12,14 with drum 46 is directly communicated to the other and also the length of the strut mechanism 32 may be changed by rotating stem 38 and star wheel 37 with respect to cylinder 33 to establish a predetermined running clearance between a first friction pad 42 on brake shoe 12 and a second friction pad 44 on brake shoe 14 and a drum 46. A resilient arrangement includes a first spring 51 that is connected to the first 12 and second 14 brake shoes for respectively urging the first ends 22,24 toward the anchor post 26 and a second spring 48 that is also connected to the first 12 and second 14 brake shoes for urging the second ends 28,30 toward the adjuster strut mechanism 32. An actuator mechanism 100 of a type disclosed in U.S. Pat. No. 6,234,281 is located adjacent the anchor post 26 and has a housing 104 with first end 101 that engages web 13 and a second end 103 end that engages web 15. The ends 101 and 103 are respectively located on ledges in web 13 and 15 and have a length there between such that when the first ends 22,24 engaging anchor 26, ends 101 and 103 also engage corresponding faces 13a and 15a on webs 13,15. A lever 106 that is located in housing 104 by a pin 108 has a cam surface that engages web 15a and a hooked end 110 that is located between the first end 101 and the second end 103.

A cable assembly 200 includes a cable 202 that has a fitting 204 on a first end 206 that is connected to the hooked end 110, see FIG. 4 for this detail, of lever 106, a release spring 208 that surrounds the cable 202 and engages the fitting 204 and a bracket 210. The bracket 210 is connected to a sheath 212 that surround cable 202 and is fixed knuckle 27 by a bolt 214 such that a spring force is exerted on fitting 204 to urge the end 206 away from knuckle 27. Cable 202 has a second end (not shown) that is connected to a pedal or some other type actuator whereby an input force under the direction of an operator pulls on cable 202 to initiate a parking brake application. In particular, to initiate a parking brake application, an input force is applied to the second end of the cable 202 which pulls on the cable 202 causing the release spring 208 to be compressed toward knuckle 27 and end 206 to move away from actuator mechanism 100. As end 206 moves away from actuator mechanism 100 lever 106 is also pulled along causing lever 106 to pivot on pin 108 and produce an expanding force in the actuator mechanism 100. The expanding force is characterized by a first force that is communicated through end 101 into web 13 and a second force that is communicated through the cam on the lever 106 into web 15. The expanding force moves the first 12 and second 14 brake shoes toward surface 45 on drum 46 and when the friction pads 42 and 44 contact surface 45 on drum 46 frictional engagement occurs. The frictional engagement is a direct function of the input force applied to the second end of the cable 202 and is designed to hold the brake drum 46 stationary with respect to knuckle 27 of the vehicle. However, if drum 46 is rotating at the time that a parking brake application is initiated by an input force being applied to the second end of cable 202, the drum-in-hat parking brake 10 can effect a brake application to retard the rotation of drum 46. On engagement of the friction pads 42,44 with surface 45 a resistive force develops causes on the first 12 and second 14 brake shoes to rotate. Depending on the direction of rotation of drum 46, one of the first ends 22,24 of the first 12 and second 14 brake shoes will be rotated into engagement with anchor 26 to oppose the resistive force of the frictional engagement developed in attempt to bring the drum 46 to a stationary relationship with respect to knuckle 27 and as a result the parking brake may function as an emergency brake. When the operator desires to terminate the parking brake application, the input force applied to the second end of cable 202 is terminated such that release spring 208 expands from its compressed relationship with respect to knuckle 27 and acts through fitting 204 to moves the first end 206 toward the actuator mechanism 100 such that return springs 48 and 51 can now act on webs 13,15 to move the friction pads 42,44 away from engagement surface 45 and thereafter allow drum 46 to rotate with respect to knuckle 27. Under some circumstances it is possible for the release spring 208 to act on the hooked end 110 and axially move the first 1 2 and second 14 brake shoes away from or out of radial alignment with backing plate 16 as illustrated in FIG. 1 by the engagement of edges 41,43 of the webs 13,15 with radial face 47 on drum 46 and create noise or even damage to the first 12 and second 14 brake shoes in the drum-in-hat brake.

In order to prevent the development of noise and damage to the components as discussed above with respect to drum-in-hat brake 10, a drum-in-hat brake 400, shown in FIG. 3, was developed according to the present invention. The drum-in-hat brake 400 was designed to prevent a change in the radial alignment between the first 12 and second 14 brake shoes and the backing plate 16 once the first 12 and second 14 brake shoes were retained on the backing plate 16 by pins 18, 20.

The components in drum-in-hat brake 400 that are different from the components in drum-in-hat brake 10 will be described in detail but the components that are the same will not be further described and the same numbers used for the description of drum-in-hat 10 are also be used in as FIGS. 3, 4, 5 and 6 to describe drum-in-hat brake 400.

Figure 5:
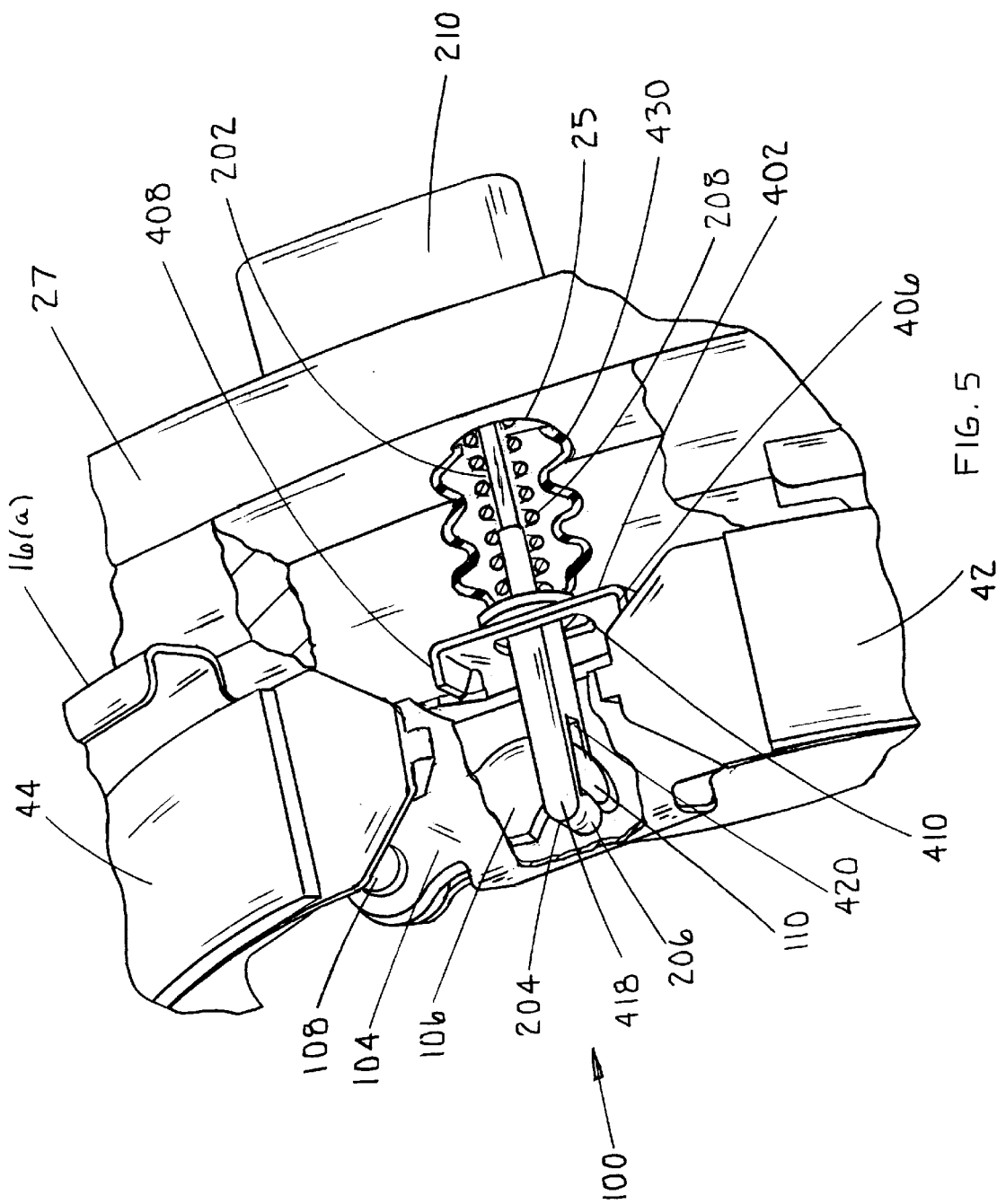
FIG. 5 is another enlarged view if the cable assembly and actuator of FIG. 3 with a cut-away view of the fitting and lever connection.
Figure 6:
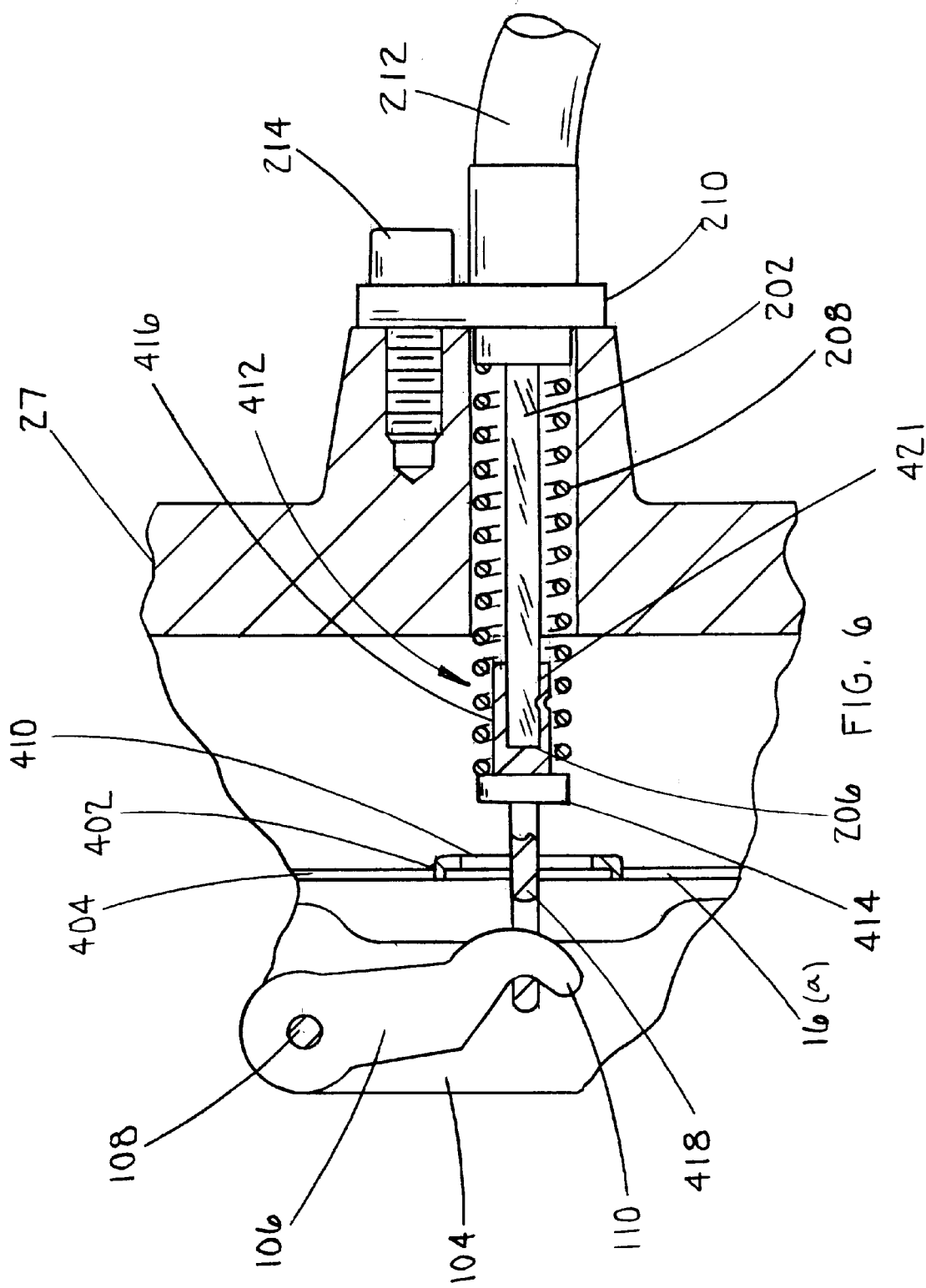
FIG. 6 is a sectional view of the cable assembly and release spring during a parking brake application.

In more particular detail, the backing plate 16(a) for the drum-in-hat brake 400 is different and as best shown in FIG. 4 and 5 and includes a flange 402 that extends in a radial plane from peripheral surface 404. Flange 402 has first 406 and second 408 arms thereon the are located at a right angle with respect to the radial plane and provide structural support such that the flange 402 remains in the radial plane with respect to the central radial disc of the backing plate. The flange 402 has a horizontal slot 410 that is located in the center there of which is designed to be in axial alignment with opening 25 in knuckle 27 through which cable 202 extends for engagement with lever 106 of the actuator mechanism 100 as best illustrated in FIGS. 5 and 6. With the backing plate 1 6 attached to knuckle 27 by bolts 19,19'. . . 19" a fixed dimension is defined between bracket 210 and flange 402 such that a length of release spring 208 is established in the development a desired release force.

The fitting 412 for cable 202 in the cable assembly 200a for drum-in-hat brake 400 is different and is best illustrated in FIGS. 4,5 and 6. Fitting 412 has by a cylindrical body with a first diameter section 414, a second diameter section 416 and a stem 418 defined by a substantially rectangular projection that axially extends from the second diameter section 416. Stem 418 has an opening 420 for receiving hooked end 110 of lever 106 while the second diameter section 416 has an axial bore 421 therein for receiving end 206 of cable 202. The second diameter section 416 is designed to be deformed by crimping to fix the fitting 412 on the end 206 of cable 202 while the diameter of the first diameter section 414 is larger than horizontal slot 410 in flange 402.

For some applications, a boot 430 that surrounds the end of the cable assembly 200a may be located between flange 402 and knuckle 27 in a manner illustrated in FIG. 5. Boot 430 is designed to reduce the communication of contamination to the cable assembly 200a that may effect the smooth actuation of cable 202 and release of the cable 202 by release spring 208.

The cable assembly 200a is attached to the actuator mechanism 100 in the following manner. Fitting 412 on the end 206 of cable 202 is passed through opening 25 in knuckle 27 and stem 418 moved through horizontal slot 410. The horizontal slot 410 assisting in maintaining a perpendicular relationship between the fitting 412 and backing plate 16 as the hooked end 110 is positioned in opening 420. When the first diameter 414 or rib on stem 418 engages flange 402 the lever 106 is in a position of respect to the actuator mechanism 100. Bolt 214 is screwed into the anchor 27 to fix bracket 210 to the anchor 27 and thereby secure cable assembly 200a to the anchor 27 such that release spring 208 is caged between flange 402 and knuckle 27. This installation would now be complete and the second end of the cable assembly 200a would thereafter be connected to complete the assembly of the drum-in-hat brake 400.

MODE OF OPERATION

The functional actuation of the drum-in-hat 400 is the same as with the drum-in-hat 10 in that an input force is applied to the second end of cable 202 that pulls on the cable 202 causing the release spring 208 to be compressed in a manner as illustrated in FIG. 6 such that fitting 412 moves hooked end 110 on lever 106 causing the actuator mechanism 100 to expand and move the friction pads 42,44 into frictional engagement with surface 45 on drum 46 to effect a parking brake application. When the parking brake application is terminated, the input force is removed from the second end of cable 202 and release spring 208 moves the first end 206 and fitting 412 toward the actuator mechanism 100 until the first diameter or annular rib 414 engages flange 402 to limit the extent that the fitting 412 may travel toward the of actuator mechanism 100. Thereafter the return spring 51 and 48 move the brake shoes 12 and 14 to a position of rest with respect to surface 45 on drum 46. With the release-spring 208 being caged between flange 402 and knuckle 27, the release spring 208 can not act on lever 106 and axially move the actuator mechanism 110. Thus the radial alignment between first 12 and second 14 brake shoes and the backing plate 16 is maintained in as illustrated in FIG. 3.

We claim:

1. A drum-in-hat park brake assembly for a vehicle wherein first and second brake shoes are positioned on and radially aligned with a backing plate by-first and second pins, said backing plate being secured to a knuckle of a suspension system in the vehicle, each of said first and second brake shoes having a first end that is aligned with respect to an anchor post that extends from said knuckle and are selectively spaced apart from each other by an actuator mechanism and a second end that are linked to each other by an adjuster mechanism, resilient means connected to said first and second brake shoes for urging said first ends toward said anchor and said second ends toward said adjuster to define a rest position for said first and second brake shoes wherein a running clearance is established between said first and second brake shoes and an engagement surface on said drum, a cable assembly having a first end connected to a lever of said actuator mechanism and a second end for receiving an input from an operator, said cable assembly being responsive to an input force applied to said second end of said cable assembly by pulling on said lever to expand said actuator assembly and move said first and second brake shoes from said position of rest into engagement with said drum to effect a brake application, said brake cable assembly including a release spring located between said first end of said cable assembly and said knuckle for urging said first end of said cable assembly toward said actuator mechanism to allow said resilient means to return said first and second brake shoes to said position of rest on termination of said input force on said second end of said cable assembly, said backing plate being characterized by a flange having a slot therein and said cable assembly being characterized in that said first end thereof has a stem with an annular rib thereon, said stem passing through said slot and said annular rib engaging said flange to limit the movement of said first end of said cable assembly toward said actuator mechanism to prevent said lever from being axially moved past a position of rest and to prevent a change in the radial alignment between said first and second brake shoes and said backing plate by the action of the release spring.

2. The parking brake as recited in claim 1 wherein said first end of said cable assembly is further characterized by said stem having an opening therein that receives a free end of the lever of said actuator mechanism.

3. The parking brake as recited in claim 2 wherein said slot in said flange is characterized by providing assistance in maintaining said first end of the cable assembly in a perpendicular relationship with respect to said backing plate.

4. The parking brake as recited in claim 3 wherein said release spring is characterized by being compressed by input force being applied to said second end of the cable assembly and said first end of said cable assembly moves toward the knuckle as the actuator mechanism expands in moving said first and second brake shoes into engagement with the engagement surface on said drum.

5. The parking brake as recited in claim 4 wherein said cable assembly is further characterized by a boot that surrounds said first end of said cable assembly and is located between said flange and knuckle to prevent contamination from being communicated to a cable.

6. The parking brake as recited in claim 5 wherein during the engagement of said first and second brake shoes with said engagement surface on said drum one of said first ends of said first and second brake shoes engages said anchor on said knuckle to oppose rotative movement of said drum.

* * * * *